(12) United States Patent
Seth et al.

(10) Patent No.: US 7,235,202 B2
(45) Date of Patent: *Jun. 26, 2007

(54) NET STRUCTURE AND METHOD OF MAKING

(75) Inventors: Jayshree Seth, Woodbury, MN (US); Ronald W. Ausen, St. Paul, MN (US); Janet A. Venne, Roseville, MN (US); Katherine A. S. Graham, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 69 days.

This patent is subject to a terminal disclaimer.

(21) Appl. No.: 10/706,530

(22) Filed: Nov. 12, 2003

(65) Prior Publication Data

US 2004/0170802 A1 Sep. 2, 2004

Related U.S. Application Data

(63) Continuation-in-part of application No. 10/376,979, filed on Feb. 28, 2003.

(51) Int. Cl.
*B29C 55/02* (2006.01)
(52) U.S. Cl. .................. 264/145; 264/167; 264/288.8
(58) Field of Classification Search ................ 428/100; 24/452; 264/145, 167, 156, 288.4, 288.8, 264/342 RE, 211.17
See application file for complete search history.

(56) References Cited

U.S. PATENT DOCUMENTS

| 3,266,113 A | 8/1966 | Flanagan, Jr. |
| 3,488,415 A | 1/1970 | Patchell et al. |
| 3,557,413 A | 1/1971 | Engle |
| 3,781,398 A * | 12/1973 | Erb ............................ 264/146 |
| 3,932,090 A * | 1/1976 | Brumlik ..................... 425/381 |

(Continued)

*Primary Examiner*—Mark Eashoo
(74) *Attorney, Agent, or Firm*—William J. Bond (57) ABSTRACT

The present invention concerns an extrusion formed reticulated web, mesh or netting including reticulated hook fasteners for use with hook and loop fasteners the polymer netting comprising two sets of strands at angles to each other. The first set of strands are a plurality of oriented (molecular orientation created by stretching) strands extending in a first direction and are generally mutually parallel and linear. The second set of strands are a plurality of substantially parallel strands attached only to a first face of the first set of oriented strands. The first set of oriented strands occupy a first planar cross-sectional area in the thickness direction of the formed netting. Said second set of oriented strands occupy a second planar cross-sectional area in the thickness direction of the formed netting. Preferably, these first and second planar cross-sectional areas are substantially mutually exclusive and are abutting. The polymer netting is preferably made by extruding a thermoplastic resin through a die plate, which die plate is shaped to form a base film layer and spaced ridges or ribs projecting from a surface of the base layer. The spaced ridges or ribs formed by the die form the first set of strands forming the reticulated mesh or netting. The second set of transverse strands are formed by transversely cutting the base layer at spaced locations along a length, at a transverse angle to the ridges or ribs, to form discrete cut portions. Subsequently longitudinal stretching of the ridges (in the direction of the ridges or the machine direction) separates these cut portions of the backing, which cut portion then form the second set of spaced apart strands of the reticulated mesh or netting.

13 Claims, 6 Drawing Sheets

U.S. PATENT DOCUMENTS

| | | |
|---|---|---|
| 3,952,127 A | 4/1976 | Orr |
| 4,001,366 A | 1/1977 | Brumlik |
| 4,056,593 A | 11/1977 | de Navas Albareda |
| 4,075,379 A | 2/1978 | Lloyd |
| 4,189,809 A | 2/1980 | Sotos |
| 4,201,814 A | 5/1980 | Gilbert et al. |
| 4,832,834 A | 5/1989 | Baird, Jr. |
| 4,894,060 A | 1/1990 | Nestegard |
| 5,011,642 A * | 4/1991 | Welygan et al. ............ 264/167 |
| 5,179,767 A * | 1/1993 | Allan ......................... 24/442 |
| 5,344,691 A | 9/1994 | Hanschen et al. |
| 5,354,597 A | 10/1994 | Capik et al. |
| 5,462,708 A | 10/1995 | Swenson et al. |
| 5,501,675 A | 3/1996 | Erskine |
| 5,605,729 A | 2/1997 | Mody et al. |
| 5,616,394 A | 4/1997 | Gorman et al. |
| 5,891,549 A | 4/1999 | Beretta et al. |
| 6,132,660 A | 10/2000 | Kampfer |
| 6,209,177 B1 | 4/2001 | Murasaki |
| 6,368,097 B1 | 4/2002 | Miller et al. |
| 2002/0112325 A1 | 8/2002 | Keohan et al. |
| 2003/0034583 A1 * | 2/2003 | Provost ...................... 264/146 |
| 2005/0079315 A1 * | 4/2005 | Seth et al. ................... 428/86 |
| 2005/0079321 A1 * | 4/2005 | Tuman et al. ............... 428/100 |
| 2006/0145387 A1 * | 7/2006 | Seth et al. .................. 264/145 |

\* cited by examiner

NET STRUCTURE AND METHOD OF MAKING

This is a continuation-in-part of application Ser. No. 10/376,979, filed Feb. 28, 2003, the disclosure of which is incorporated herein by reference.

SUMMARY OF THE INVENTION

The present invention concerns an extrusion formed reticulated web, mesh or netting including reticulated hook fasteners for use with hook and loop fasteners.

BACKGROUND OF THE INVENTION

A method of forming a reticulated hook element is disclosed in U.S. Pat. No. 4,001,366 which describes forming hooks by known methods, similar to that disclosed in U.S. Pat. Nos. 4,894,060 and 4,056,593, discussed below. A reticulated web or mesh structure is formed by intermittently slitting (skip slit) extruded ribs and bases and then pulling to expand the skip slit structure into a mesh.

U.S. Pat. No. 5,891,549 describes a method for forming a net sheet having surface protrusions thereon. The net is used primarily as spacer elements for drainage and like applications. The net has parallel elements that extend at right angles to each other and it would appear to be formed by a direct molding process involving directly extruding the net-like structure onto a negative mold of the netting.

A film extrusion process for forming hooks is proposed, for example, in U.S. Pat. Nos. 4,894,060 and 4,056,593, which permits the formation of hook elements by forming rails on a film backing. Instead of the hook elements being formed as a negative of a cavity on a molding surface, as is the more traditional method, the basic hook cross-section is formed by a profiled film extrusion die. The die simultaneously extrudes the film backing and rib structures. The individual hook elements are then preferably formed from the ribs by cutting the ribs transversely, followed by stretching the extruded strip in the direction of the ribs. The backing elongates but the cut rib sections remain substantially unchanged. This causes the individual cut sections of the ribs to separate each from the other in the direction of elongation forming discrete hook elements. Alternatively, using this same type extrusion process, sections of the rib structures can be milled out to form discrete hook elements. With this profile extrusion, the basic hook cross section or profile is only limited by the die shape and hooks can be formed that extend in two directions and have hook head portions that need not taper to allow extraction from a molding surface.

BRIEF DESCRIPTIONS OF THE INVENTION

The present invention is directed at a polymer netting comprising two sets of strands at angles to each other. The first set of strands are a plurality of oriented (molecular orientation created by stretching) strands extending in a first direction and are generally mutually parallel and linear. These first set of strands have a first face and a second face and two side faces. The second set of strands are a plurality of substantially parallel strands attached only to said first face of the first set of oriented strands. The second set of strands also have a first face and a second face and two substantially parallel side faces, where said second set of strands second faces are attached to said first set of oriented strands. The first set of oriented strands occupy a first planar cross-sectional area in the thickness direction of the formed netting. Said second set of oriented strands occupy a second planar cross-sectional area in the thickness direction of the formed netting. Preferably, these first and second planar cross-sectional areas are substantially mutually exclusive and are abutting. The polymer netting is preferably made by a novel adaptation of a known method of making hook fasteners as described, for example, in U.S. Pat. Nos. 3,266,113; 3,557,413; 4,001,366; 4,056,593; 4,189,809 and 4,894,060 or alternatively U.S. Pat. No. 6,209,177, the substance of which are incorporated by reference in their entirety.

The preferred method generally includes extruding a thermoplastic resin through a die plate, which die plate is shaped to form a base film layer and spaced ridges or ribs projecting from a surface of the base layer. The spaced ridges or ribs formed by the die form the first set of strands forming the reticulated mesh or netting. The second set of transverse strands are formed by transversely cutting the base layer at spaced locations along a length, at a transverse angle to the ridges or ribs, to form discrete cut portions. Subsequently longitudinal stretching of the ridges (in the direction of the ridges or the machine direction) separates these cut portions of the backing, which cut portion then form the second set of spaced apart strands of the reticulated mesh or netting. The stretching also orients the ridges increasing their strength and flexibility.

In a preferred method a die plate is shaped to form a base film layer and spaced ridges, ribs or hook elements projecting from both surfaces of the base layer. The optional second set of ridges generally forms the cross-section shapes of the desired discrete projections to be produced, which are preferably hook members. The initial hook member thickness is formed by transversely cutting these secondary ridges and the base at spaced locations along their lengths to form discrete cut portions of the base with the ridges. Subsequently longitudinal stretching of the backing layer (in the direction of the ridges on the machine direction) separates these discrete cut portions, which cut portions then form the second set of spaced apart strands having projections or hook members, that have a cross-sectional shape identical to the cross-sectional shape of the second set of extruded ridges.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENT

Figure 1:
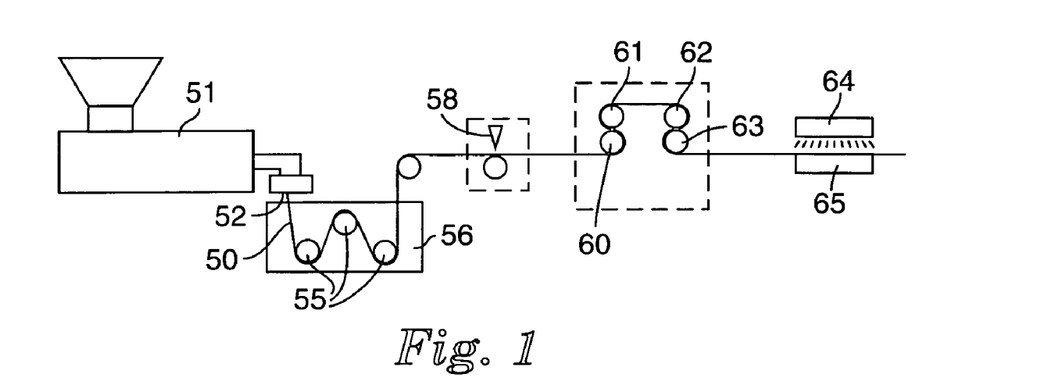
FIG. 1 schematically illustrates a method for making a netting such as shown in FIGS. 2–4.
Figure 2:
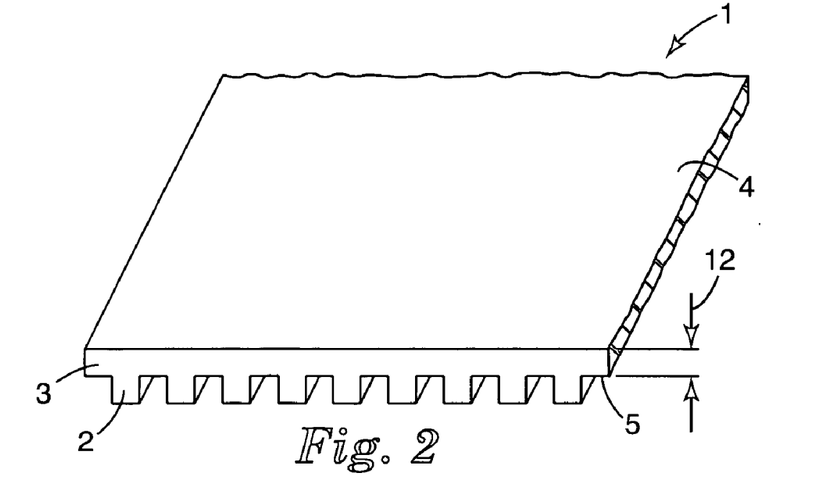
FIG. 2 is a perspective view of a precursor film used to make the netting of FIG. 4.
Figure 4:
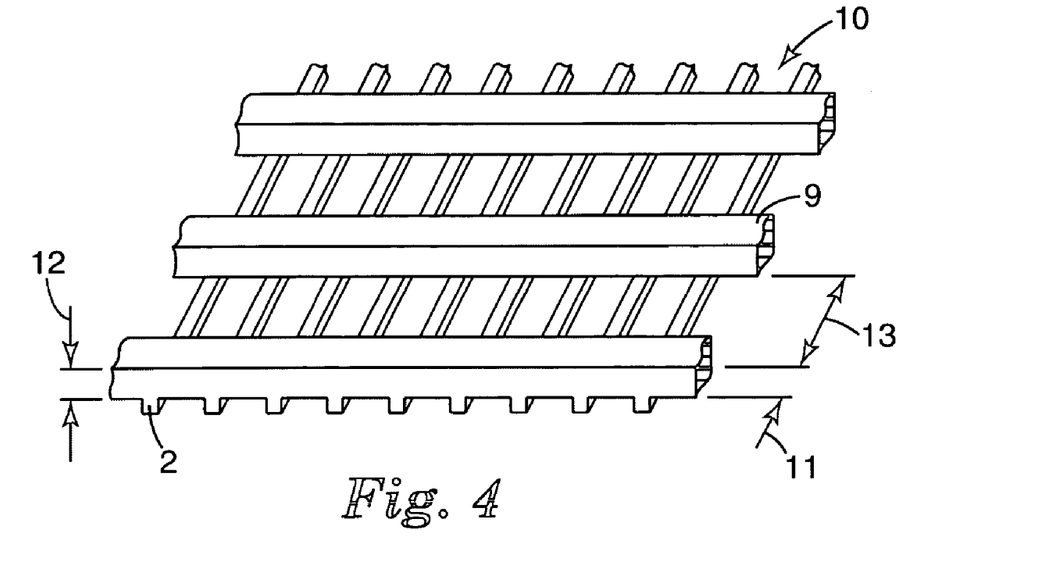
FIG. 4 is a perspective view of a first embodiment netting in accordance with the present invention.

A first embodiment method for forming a reticulated mesh or netting, such as that of FIG. 4, is schematically illustrated in FIG. 1. Generally, the method includes first extruding a strip 50 such as the strip 1, shown in FIG. 2, of thermoplastic resin from an extruder 51 through a die 52 having an opening cut, for example, by electron discharge machining, shaped to form the strip 50 with a base 3, and elongate spaced ribs 2 projecting from at least one surface 5 of the base layer 3 that have a predetermined cross sectional shape. If desired, a second set of ridges or ribs can be provided on the second surface 4 of the base layer 3 which second set of ridges can have any predetermined shape, including that of a desired hook portions or members. The strip 50 is pulled around rollers 55 through a quench tank 56 filled with a cooling liquid (e.g., water), after which the base layer 3 is transversely slit or cut at spaced locations 7 along its lengths by a cutter 58 to form discrete portions 6 of the base layer 3. The distance between the cut lines corresponds to about the desired width 11 of the strand portions 9 to be formed, as is shown in FIG. 4. The cuts 7 can be at any desired angle, generally from 90° to 30° from the lengthwise extension of the ribs 2. Optionally, the strip can be stretched prior to cutting to provide further molecular orientation to the polymers forming the base layer 3 or ribs 2 and reducing the size of the ridges or ribs 2 or base layer thickness 12 and also reducing the size of the strands 9 formed by slitting of the base layer 3. The cutter 58 can cut using any conventional means such as reciprocating or rotating blades, lasers, or water jets, however preferably it cuts using blades oriented at an angle of about 60 to 90 degrees with respect to lengthwise extension of the ribs 2.

The die 52 in FIG. 1 can be a single layer die so as to form a single layer strip with the base layer and first and optionally a second set of ribs formed of the same thermoplastic resin. Alternatively, the die 52 can be a multiple layer die where each of the base layer, the first set of ribs, and the optional second set of ribs can be formed of a separate thermoplastic resin and/or each of the base layer or set of rib layer(s) could be formed of multiple layers of thermoplastic resin.

After cutting of the base layer 3, the ridges or ribs 2 of the strip 50 are longitudinally stretched at a stretch ratio of 1.5, and preferably at a stretch ratio of at least about 3.0, preferably between a first pair of nip rollers 60 and 61 and a second pair of nip rollers 62 and 63 driven at different surface speeds. This forms the first set of oriented strands 8. Optionally, the strip 50 can also be transversely stretched to provide orientation to the strands 9 in their lengthwise extension. The method would apply to all embodiments of the invention. Roller 61 is preferably heated to heat the base 3 prior to stretching, and the roller 62 is preferably chilled to stabilize the stretched base 3. Stretching causes spaces 13 between the cut portions 6 of the base layer 3, which then become the second set of strands 8 for the completed netting 10.

Formed hook members if present can also be heat treated preferably by a non-contact heat source 64. The temperature and duration of the heating should be selected to cause shrinkage or thickness reduction of at least the head portion by from 5 to 90 percent. The heating is preferably accomplished using a non-contact heating source which can include radiant, hot air, flame, UV, microwave, ultrasonics or focused IR heat lamps. This heat treating can be over the entire strip containing the formed hook portions or can be over only a portion or zone of the strip. Or different portions of the strip can be heat treated to more or less degrees of treatment. In this manner, it is possible to obtain on a single strip hook containing areas with different levels of performance without the need to extrude different shaped rib profiles. This heat treatment can change hook elements continuously or in gradients across a region of the hook strip. In this manner, the hook elements can differ continuously across a defined area of the hook member. Further, the hook density can be the same in the different regions coupled with substantially the same film backing caliper or thickness (e.g., 50 to 500 microns). The caliper can easily be made the same as the hook strip will have the same basis weight and same relative amount of material forming the hook elements and backing in all regions despite the difference in the shape of the hooks caused by the subsequent heat treating. The differential heat treatment can be along different rows or can cut across different rows, so that different types of hooks, such as hooks having different hook thicknesses, can be obtained in a single or multiple rows in the machine direction or the lengthwise direction of the hook strip. The heat treatment can be performed at any time following creation of the hook element, such that customized performance can be created without the need for modifying the basic hook element manufacturing process.

Figure 5:
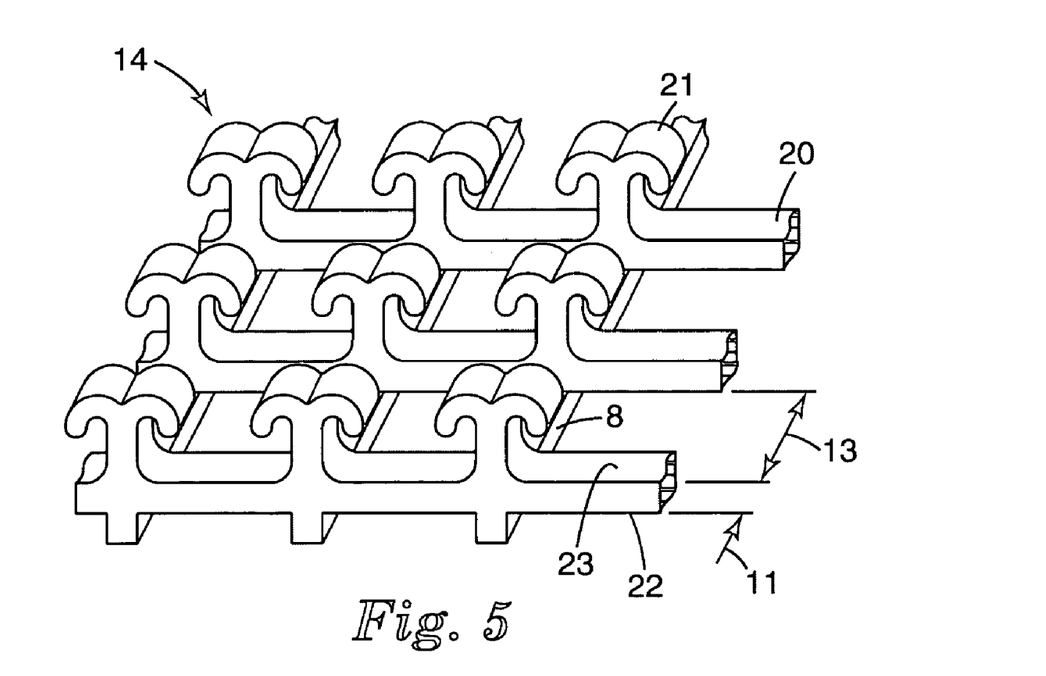
FIG. 5 is a perspective view of a second embodiment netting in accordance with the present invention having hook elements.
Figure 6A:
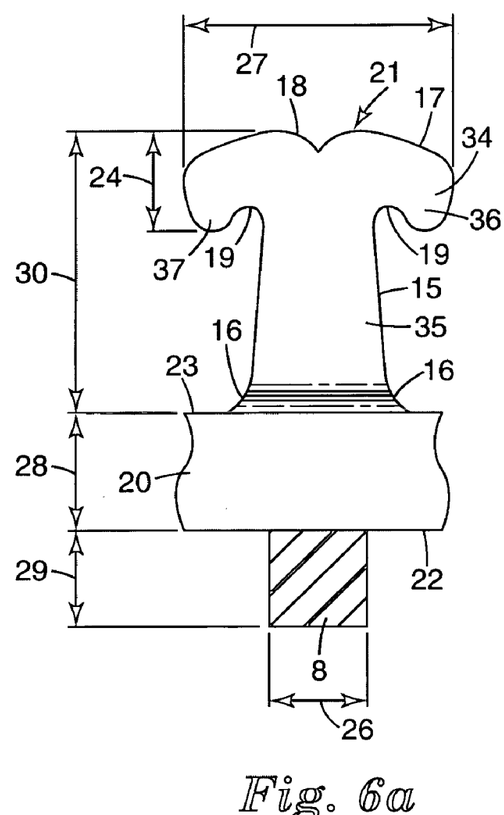
FIGS. 6a and 6b are enlarged fragmentary side and end views, respectively, of one hook member such as those of the mesh hook netting of FIG. 5.
Figure 6B:
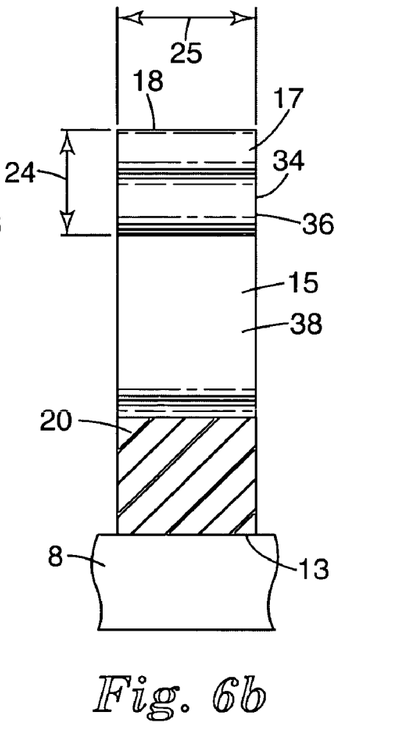

Referring now to FIG. 5, an exemplary polymeric mesh hook fastener portion, which can be produced, according to the present invention generally designated by the reference numeral 14 is shown. The mesh hook netting comprises strands 20 having generally parallel upper and lower major surfaces 23 and 22, and a multiplicity of spaced hook members 21 projecting from at least the upper surface 23 of the strand 20. The strand 20 can have planar surfaces or surface features as could be desired for tear resistance or reinforcement. The strands 20 are separated from each other by cuts and elongation of ribs 8. As is best seen in FIGS. 6a and 6b, the hook members 21 each comprise a stem portion 15 attached at one end to a strand 20 and preferably having tapered sections 16 that widen toward the strand 20 to increase the hook anchorage and breaking strengths at their junctures with a strand 20, and a head portion 17 at the end of the stem portion 15 opposite strand 20. The sides 34 of the head portion 17 can be flush with the sides 35 of the stem portion 15 on two opposite sides. The head portion 17 has hook engaging parts or arms 36, 37 projecting past the stem portion 15 on one or both sides 38. The hook member shown in FIGS. 6a and 6b can have a rounded surface 18 opposite the stem portion 15. The head portion 17 shown also has transverse cylindrically concave surface portions 19 at the junctures between the stem portion 15 and the surfaces of the head portion 17 projecting over strand 20.

With reference to FIGS. 6a and 6b, there is shown a single representative one of the small hook members 21 on which its dimensions are represented by reference numerals between dimensional arrows. The height dimension is 30. The stem and head portions 15 and 17 have a thickness dimension 25, which as shown is the same, and the head portions 17 have a width dimension 27 and an arm droop 24. The stem portion has a width dimension 26 at its base before flaring 16 to the strand 20. The thickness as shown is for a rectilinear shaped hook, with other shapes the thickness can be measured as the shortest distance between two opposing sides 34 or 35. Likewise, the width dimension can be measured as the shortest distance between two opposing sides.

Figure 7:
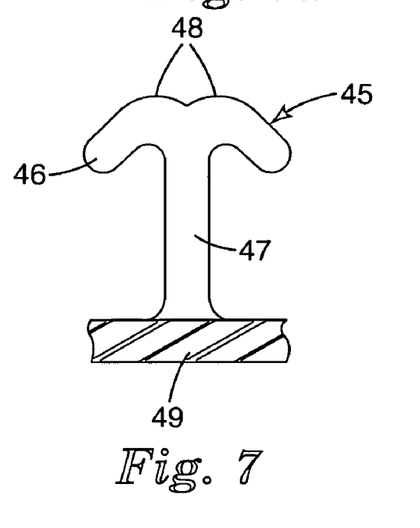
FIG. 7 is an enlarged fragmentary sectional view of an alternative embodiment hook portion that can be made according to the present invention.
Figure 8:
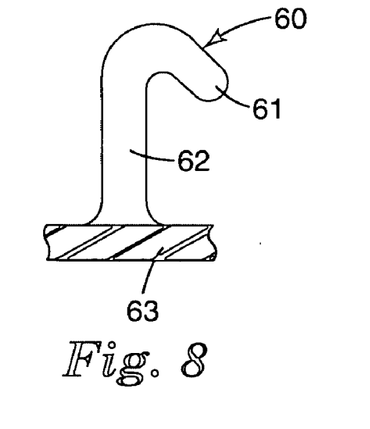
FIG. 8 is an enlarged fragmentary sectional view of an alternative embodiment hook portion that can be made according to the present invention.

FIGS. 7 and 8 illustrate two of many alternate shapes that could be used for the hook members in alternate embodiments of the hook members that can be formed in accordance with the invention method.

The hook member 45 illustrated in FIG. 7 differs from the hook member 21 of FIG. 5 in that its head portion 46 projects farther on opposite sides from its stem portion 47 and is generally uniformly thick so that it can more easily bend to engage with or disengage from loops on a loop fastener portion.

The hook member 60 illustrated in FIG. 8 differs from the hook member 21 of FIG. 5 in that its head portion 61 projects from only one side of its stem portion 62 and will thus cause significantly greater peel forces when peeled away from the direction the head portion 61 projects than when it is peeled toward the direction the head portion 61 projects.

With all of these hook shapes the hook shape and dimensions can be altered following formation by heat treatment of at least the hook elements. Heat treating in particular will tend to shrink the hook width in the direction that the ribs where extruded, by relaxing any molecular orientation in the hooks as a result of the extrusion of the ribs. In this case the width of the hooks can be less than that of the strands from which the hooks project.

Suitable inelastic polymeric materials from which the netting of the invention can be made include thermoplastic resins comprising polyolefins, e.g. polypropylene and polyethylene, polyvinyl chloride, polystyrene, nylons, polyester such as polyethylene terephthalate and the like and copolymers and blends thereof. Preferably the resin is a polypropylene, polyethylene, polypropylene-polyethylene copolymer or blends thereof.

The netting can also be a multilayer construction such as disclosed in U.S. Pat. Nos. 5,501,675; 5,462,708; 5,354,597 and 5,344,691 the substance of which are substantially incorporated herein by reference. These references teach various forms of multilayer or coextruded elastomeric laminates, with at least one elastic layer and either one or two relatively inelastic layers. A multilayer netting could also be formed of two or more elastic layers or two or more inelastic layers in any combination utilizing these known multilayer coextrusion techniques.

Inelastic layers are preferably formed of semicrystalline or amorphous polymer or blends. Inelastic layers can be polyolefinic, formed predominately of polymers such as polyethylene, polypropylene, polybutylene, polyethylenepolypropylene copolymer.

Elastomeric materials which can be extruded into film include ABA block copolymers, polyurethanes, polyolefin elastomers, polyurethane elastomers, EPDM elastomers, metallocene polyolefin elastomers, polyamide elastomers, ethylene vinyl acetate elastomers, polyester elastomers, or the like. An ABA block copolymer elastomer generally is one where the A blocks are polyvinyl Arlene, preferably polystyrene, and the B blocks are conjugated dienes specifically lower alkylene diene. The A block is generally formed predominately of monoalkylene arenes, preferably styrenic moieties and most preferably styrene, having a block molecular weight distribution between 4,000 and 50,000. The B block(s) is generally formed predominately of conjugated dienes, and has an average molecular weight of from between about 5,000 to 500,000, which B block(s) monomers can be further hydrogenated or functionalized. The A and B blocks are conventionally configured in linear, radial or star configuration, among others, where the block copolymer contains at least one A block and one B block, but preferably contains multiple A and/or B blocks, which blocks may be the same or different. A typical block copolymer of this type is a linear ABA block copolymer where the A blocks may be the same or different, or multi-block (block copolymers having more than three blocks) copolymers having predominately A terminal blocks. These multi-block copolymers can also contain a certain proportion of AB diblock copolymer. AB diblock copolymer tends to form a more tacky elastomeric film layer. Other elastomers can be blended with a block copolymer elastomer(s) provided that they do not adversely affect the elastomeric properties of the elastic film material. A blocks can also be formed from alphamethyl styrene, t-butyl styrene and other predominately alkylated styrenes, as well as mixtures and copolymers thereof. The B block can generally be formed from isoprene, 1,3-butadiene or ethylene-butylene monomers, however, preferably is isoprene or 1,3-butadiene.

Figure 10:
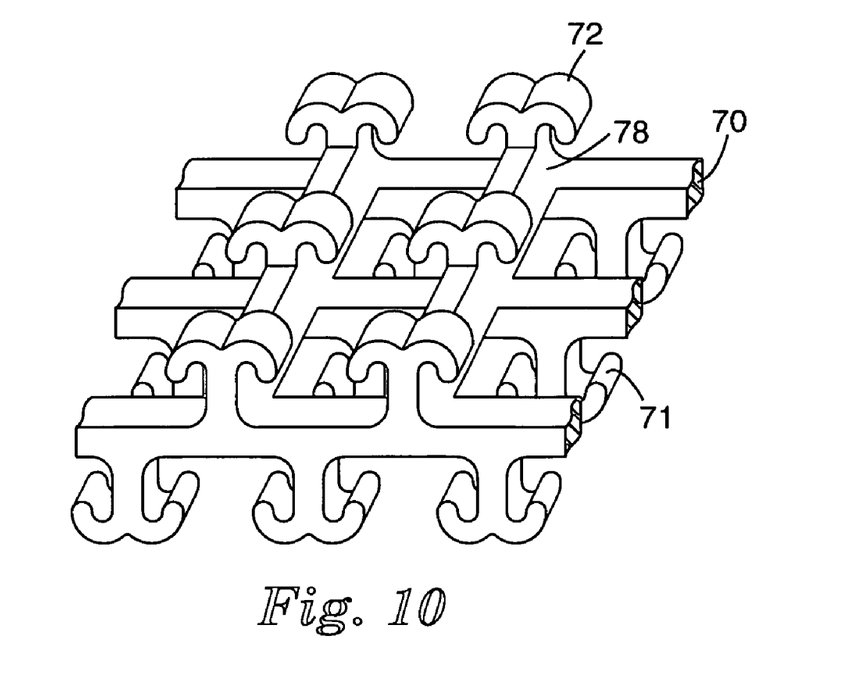
FIG. 10 is a perspective view of another netting in accordance with the present invention having hook elements.

An extruded hook netting is shown in FIG. 10, which results in hook fastening elements on both faces of the netting. Generally, with a hook netting as shown in FIG. 10, the precursor film has elongate spaced ribs that project from both surfaces of the base layer where each set of ribs has a cross-sectional shape of the hook portions or members to be formed. The ribs on one face are partially transversely slit at spaced locations along their lengths. The entire ribs and the base layer on the other face are fully cut as per, e.g., the FIG. 5 embodiment. When the partially cut ribs are longitudinally elongated or stretched, as per the FIG. 5 embodiment, they form hook elements 72 and oriented ribs 78. Simultaneously with longitudinal stretching, the cut base layer and other set of ribs form transverse strands 70 and hook elements 71, on the strands 70.

Figure 9:
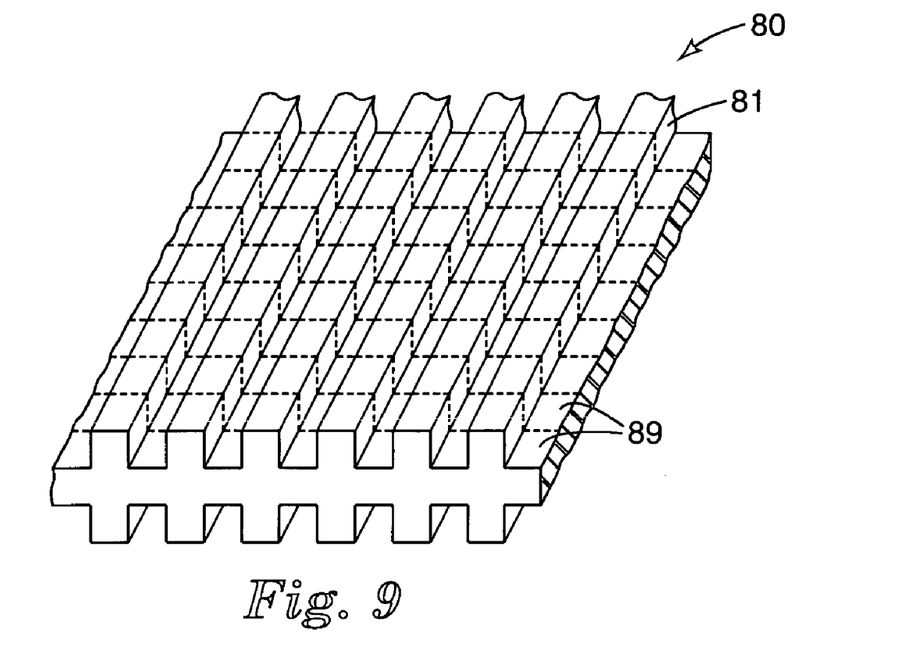
FIG. 9 is a perspective view of another netting in accordance with the present invention.

FIG. 9 shows an embodiment 80 where the secondary ribs 81 are not in the form of hooks in their cross sectional profile. This will result in stems being formed on the secondary strands 89 that could be subsequently formed into hook elements such as by the method described in U.S. Pat. Nos. 6,368,097 and 6,132,660, the substance of which is incorporated herein by reference.

Figure 3:
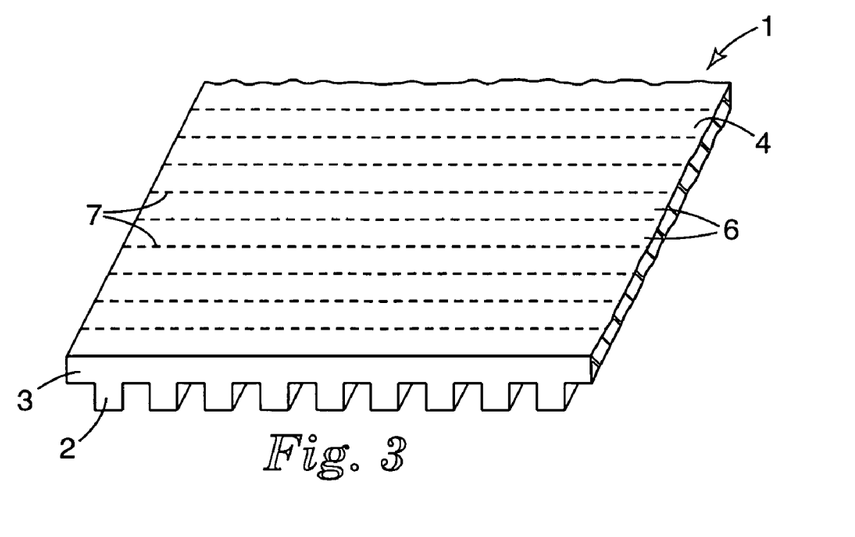
FIG. 3 is a perspective view of a first embodiment netting cut precursor film in accordance with the present invention.
Figure 11:
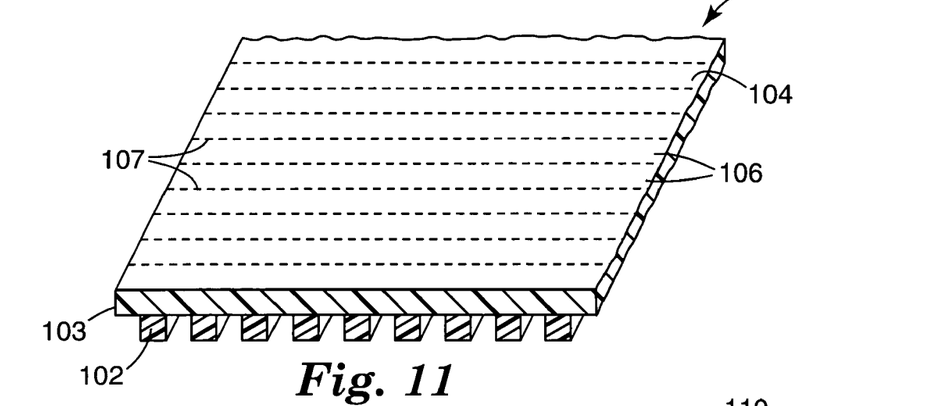
FIG. 11 is a perspective view of another netting precursor film in accordance with the present invention having multiple layers.
Figure 12:
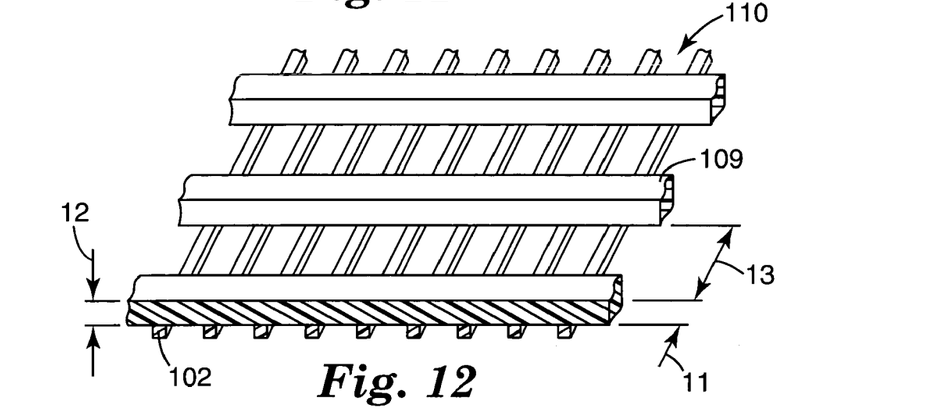
FIG. 12 is a perspective view of the FIG. 11 embodiment film formed into a netting.

The extruded netting precursor of FIG. 11 is an example of a multiple layer embodiment where the base layer 103 is formed of one thermoplastic resin and the set of ribs or ridges 102 are formed of a second thermoplastic resin. The spaced cuts 107 form discrete portions 106. If the ribs or ridges 102 are elastic resin materials or blends then longitudinal stretching will result in an elastic film that is elastic at least in the longitudinal direction and when placed under tension would result in the elastic ribs 102 elongating and reducing in cross-section as shown in FIG. 12, with the portions 106 forming strand portions 109. The strand portions keep the elastic strands attached and spaced each from the other. If the portions 106 are inelastic then the netting would be inelastic in the transverse direction. Optionally, these separated inelastic portions 106 or strands 109 could be stretched and permanently deformed to form a more open netting as well as further separate the elastic ribs 102. If the base layer 103 is an elastic layer and the ribs or ridges 102 are inelastic then the structure of FIG. 11 will be elastic in the transverse direction and the discrete portions 106 would narrow when stretched forming an open netting when placed under tension and then return to a filmlike state of FIG. 11 when the tension is released, forming a closed or partially closed netting. A permanent elastic netting as shown in FIG. 12 would be formed if the ridges 102 were inelastic and longitudinally stretched as per the embodiment of FIGS. 2–4. In this case, an open netting 110 is formed which has transverse elastic strands 109.

Figure 13:
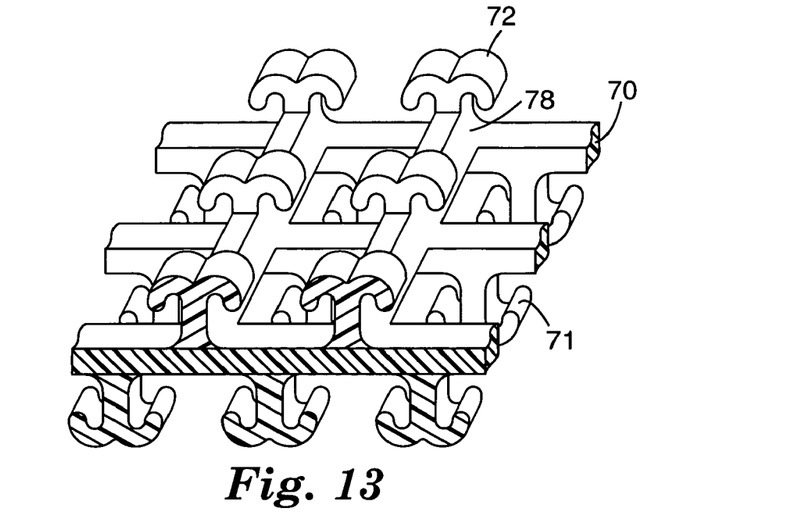
FIG. 13 is a perspective view of another netting in accordance with the present invention having hook elements with multiple film layers.

FIG. 13 is an example of the FIG. 10 embodiment formed of multiple layers. If the base layer is elastic then strands 70 formed therefrom would be elastic forming an elastic hook structure which is elastic in the transverse direction. Alternatively, hook elements 71 could be elastic.

With all multilayer embodiments, layers could be used to provide specific functional properties in one or both directions of the netting or hook netting such as softness, stiffness, elasticity, bendability, roughness or the like.

The invention extruded hook netting, such as shown in FIGS. 5 and 10, is highly breathable and dimensionally stable, in at least the direction of oriented strands 8 or 78. The longitudinal dimensional stability means that the netting will have essentially the same dimensions when untensioned and when placed under moderate tension. Further, the invention would also be dimensionally stable in the direction of the transverse strands cut from the base layer particularly if the transverse strands are at substantially right angles to the oriented strands. These transverse strands can also be oriented to increase their mechanical strength and reduce their basis weight while increasing their flexibility and dimensional stability. In a particularly preferred application, the material is self-mating with itself and as such is an extremely low cost and highly functional as a bundling material such as a bundling strap, a vegetable wrap or like applications where breathability and self engageability are important. The extruded hook netting in particular could find use in disposable garment applications such as headbands, diapers, incontinent briefs, feminine hygiene articles and the like where it is desirable to have an engaging material that would conform to a user and provide breathability. In these and other applications, the hook netting could also be laminated to other structures by conventional techniques such as adhesive lamination, thermal or pressure welding, such as fibrous webs (e.g., nonwoven fibrous knitted or stitch bonded fibrous materials), films or three-dimensional structures.

Test Methods

135 Degree Peel Test

The 135 degree peel test was used to measure the amount of force that was required to peel a sample of the mechanical fastener hook material from a sample of loop fastener material. A 5.1 cm×12.7 cm piece of a loop test material was securely placed on a 5.1 cm×12.7 cm steel panel by using a double-coated adhesive tape. The loop material was placed onto the panel with the cross direction of the loop material parallel to the long dimension of the panel. A 1.9 cm×2.5 cm strip of the mechanical fastener to be tested was cut with the long dimension being in the machine direction of the web. A 2.5 cm wide paper leader was attached to the smooth side of one end of the hook strip. The hook strip was then centrally placed on the loop so that there was a 1.9 cm×2.5 cm contact area between the strip and the loop material and the leading edge of the strip was along the length of the panel. The strip and loop material laminate was then rolled by hand, twice in each direction, using a 1000 gram roller at a rate of approximately 30.5 cm per minute. The sample was then placed in a 135 degree peel jig. The jig was placed into the bottom jaw of an Instron™ Model 1122 tensile tester. The loose end of the paper leader was placed in the upper jaw of the tensile tester. A crosshead speed of 30.5 cm per minute and a chart recorder set at a chart speed of 50.8 cm per minute was used to record the peel force as the hook strip was peeled from the loop material at a constant angle of 135 degrees. An average of the four highest peaks was recorded in grams. The force required to remove the mechanical fastener strip from the loop material was reported in grams/2.54 cm-width. A minimum of 10 tests were run and averaged for each hook and loop combination.

Two different loop materials were used to measure the performance of the mechanical fastener hook material. Loop material 'A' is a nonwoven loop made similar to that described in U.S. Pat. No. 5,616,394 Example 1, available from the 3M Company as KN-1971. Loop material 'B' is a knitted loop made similar to that described in U.S. Pat. No. 5,605,729, Example 1 available from the 3M Company as XML-01-160. The loop test materials were obtained from a supply roll of the material after unwinding and discarding several revolutions to expose "fresh" material. The loop test material thus obtained was in a relatively compressed state and was used immediately in the peel test before any significant relofting of the loops could occur.

Dynamic Shear

The dynamic shear test was used to measure the amount of force required to shear the sample of mechanical fastener hook material from a sample of loop fastener material. A 2.5 cm×7.5 cm loop sample was cut with the short dimension being the machine direction of the hook. This loop sample was then reinforced with 3M strapping tape on the backside of the loop. A 1.25 cm×2.5 cm hook sample was also prepared. The long dimension is the machine direction of the hook. This sample was laminated to the end of a tab of 3M strapping tape 2.5 cm wide×7.5 cm long. The strapping tape was doubled over on itself on the end without hook to cover the adhesive. The hook was then placed centrally on the loop with long tab directions parallel to each other such that the loop tab extended past on the first end and the hook tab extended past on the second end. The hook was rolled down by hand with a 5 kg rolldown 5 replicates up and back. The assembled tabs were placed into the jaws of an Instron Model 1122 tensile tester. The hook tab placed in the top jaw, the loop tab placed in the bottom jaw. A crosshead speed of 30.5 cm per minute and a chart recorder set at a chart speed of 50.8 cm per minute was used to record the shear force as the hook strip was sheared from the loop material at a constant angle of 180 degrees. The maximum load was recorded in grams. The force required to shear the mechanical fastener strip from the loop material was reported in grams/2.54 cm-width. A minimum of 10 tests were run and averaged for each hook and loop combination.

Hook Dimensions

The dimensions of the hook materials were measured using a Leica microscope equipped with a zoom lens at a magnification of approximately 25×. The samples were placed on a x-y moveable stage and measured via stage movement to the nearest micron. A minimum of 3 replicates were used and averaged for each dimension. In reference to the Example hooks, as depicted generally in FIGS. 6a and 6b, hook width is indicated by distance 27, hook height is indicated by distance 30, arm droop is indicated by distance 24, and hook thickness is indicated by distance 25. The dimensions of the hook materials of the invention are shown in Table 1 below.

EXAMPLE 1

A mesh hook netting was made using apparatus similar to that shown in FIG. 1. A polypropylene/polyethylene impact copolymer (SRC7-644, 1.5 MFI, Dow Chemical) was extruded with a 6.35 cm single screw extruder (24:1 L/D) using a barrel temperature profile of 175° C.-230° C.-230° C. and a die temperature of approximately 230° C. The extrudate was extruded vertically downward through a die having an opening cut by electron discharge machining to produce an extruded profiled web similar to that shown in FIG. 6a and referred to below as precursor web. The crossweb spacing of the upper ribs was 7.3 ribs per cm. After being shaped by the die, the extrudate is quenched in a water tank at a speed of 6.1 meter/min with the water being maintained at approximately 10° C. The web was then advanced through a cutting station where the upper ribs and the base layer (but not the lower ribs) were transversely cut at an angle of 23 degrees measured from the transverse direction of the web. The spacing of the cuts was 305 microns. After cutting the upper ribs and the base layer, the reticulated web was longitudinally stretched at a stretch ratio of approximately 3 to 1 between a first pair of nip rolls and a second pair of nip rolls to further separate the individual hook elements to approximately 8.5 hooks/cm to produce a hook netting similar to that shown in FIG. 5. The thickness of the base layer was 219 microns. The upper roll of the first pair of nip rolls was heated to 143° C. to soften the web prior to stretching. The second pair of nip rolls were cooled to approximately 10° C.

EXAMPLE 2

The netting of Example 1 was subjected to a non-contact heat treatment on the hook side of the netting by passing the netting at 7.3 meters/min through a gap defined by a heated support roll and a curvilinear perforated metal plate. The perforations were approximately 0.6 cm in diameter and spaced approximately 3.0 cm from each other. The netting was treated over a radial distance of the 46 cm. Hot air at a temperature of approximately 185° C., provided by a 15 kW electric heater, was blown through the perforations in the metal plate onto the hook side of the netting at a velocity of approximately 3350 meter/min. The hooks were approximately 2.5 cm from the perforated plate. The smooth base film side of the web was supported on the heated roll at approximately 149° C. After heat treatment the web was cooled by passing the web over a chill roll maintained at 52° C.

EXAMPLE 3

The precursor web of Example 1 was biaxially stretched in a Karo IV pantograph film stretcher (Bruchner Gmbh) using a chamber temperature of 150° C. The web was preheated for one minute at 150° C. and then simultaneously stretched 3×in the machine direction (MD) and 2.8× in the cross direction (CD) at an interval of 0.67 seconds MD and a 60 second interval CD.

EXAMPLE 4

A web was made as in Example 1 except the thickness of the base layer was 150 microns.

TABLE 1

|  | Precursor Web | Example 1 | 2 | 3 | 4 |
|---|---|---|---|---|---|
| Hook Width (μ) | 550 | 498 | 524 | 567 | 517 |
| Hook Height (μ) | 564 | 566 | 556 | 514 | 562 |
| Hook Droop (μ) | 249 | 229 | 292 | 192 | 229 |
| Hook Thickness (μ) | 307 | 327 | 267 | 302 | 306 |
| Base Thickness (μ) | 214 | 219 | 199 | 98 | 150 |
| Rib Width (μ) | 512 | 285 | 266 | 382 | 279 |
| Rib Height (μ) | 545 | 257 | 283 | 235 | 363 |
| Hook Spacing (CD, /cm) | 7.3 | 9.0 | 8.9 | 3.6 | 8.3 |
| Hook Spacing (MD, /cm) | 25.5 | 8.5 | 7.8 | 6.8 | 7.7 |

TABLE 2

| Example | Peel Strength Loop Material 'A' (gms/2.54 cm) | Peel Strength Loop Material 'B' (gms/2.54 cm) | Shear Strength Loop Material 'A' (gms/2.54 cm) | Shear Strength Loop Material 'B' (gms/2.54 cm) |
|---|---|---|---|---|
| 1 | 358 | 217 | 3428 | 3550 |
| 4 | 346 | 312 | 1524 | 2692 |

EXAMPLE 5

Figure 14:
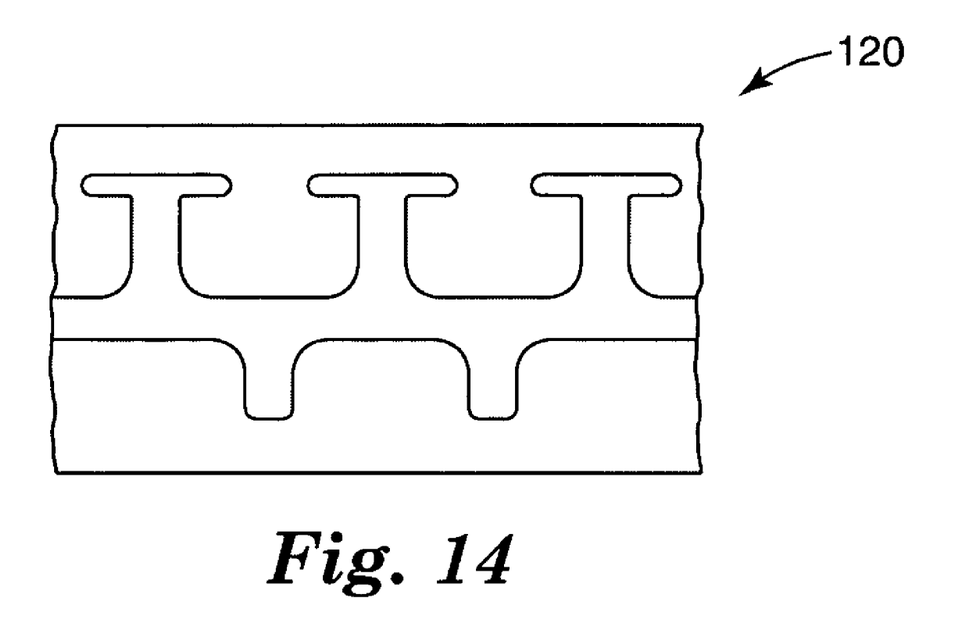
FIG. 14 is a cross-section view of a die plate.

To demonstrate a hook netting that is elastic in the cross direction, a mechanical fastener hook web was made as in Example 1 except a coextrusion process was used to produce a 3 layer structure consisting of a top hook rib layer, a central backing layer and a bottom rail layer. The top and bottom layers were produced with a polypropylene/polyethylene impact copolymer (7523, 4.0 MFI, Basell Polyolefins Company, Hoofddorp, Netherlands). The central backing layer was produced with a linear styrene-isoprene-styrene block copolymer (VECTOR 4211, Dexco Polymers, Houston, Tex.). A 6.35 cm single screw extruder was used to supply 7523 copolymer for the top hook rib layer and a 3.18 cm single screw extruder was used to supply 7523 copolymer for the bottom rail layer. A 3.81 cm single screw extruder was used to supply 4211 elastomer for the central backing layer. The barrel temperature profiles of all three extruders were approximately the same from a feed zone of 215° C. gradually increasing to 238° C. at the end of the barrels. The melt streams of the three extruders were fed to a ABC three layer coextrusion feedblock (Cloeren Co., Orange, Tex.)

configured so as to deliver 7523 copolymer to the A and C layers and 4211 elastomer to the B layer. The feedblock was mounted onto a 36 cm die equipped with a profiled die plate 120 similar to that shown in FIG. 14. The feedblock and die were maintained at 238° C. After being shaped by the die plate, the extrudate was quenched in a water tank at a speed of 3.35 meter/min with the water being maintained at approximately 44° C.–46° C. The web was air dried and collected into a roll. The central backing layer had an average thickness of 229 microns. The average height of the ribs in the top layer was 246 microns. The average height of the rails in the bottom layer was 271 microns. The roll of web material was then unwound and advanced through a cutting station where the top layer ribs and the central backing layer (but not the bottom rail layer) were transversely cut at an angle of 23 degrees measured from the transverse direction of the web. The spacing of the cuts was 305 microns. After cutting the ribs, the bottom rail layer of the web was longitudinally stretched at a stretch ratio of approximately 3 to 1 between a first pair of nip rolls and a second pair of nip rolls to further separate the individual hook elements to approximately 22 hooks/cm. The upper roll of the first pair of nip rolls was heated to 116° C. to soften the web prior to stretching. There were approximately 9 rows of ribs or cut hooks per centimeter. The bottom rail layer had a thickness of approximately 246 microns after stretching. The width of the individual hook elements measured near the top of the hooks, was approximately 310 microns as measured in the cross-direction of the web. Some of the dimensions of the structural elements of the precursor web before cutting and stretching and the cut and stretched web are shown in Table 3 below. A perspective view of the web is shown in FIG. 5 with a front and side view of an individual hook element shown in FIGS. 6*a* and 6*b* respectively. The hook netting was elastic in the cross direction due to the continuous elastic strands in the cross direction, and strong and inelastic in the machine direction due to the continuous inelastic strands in the machine direction.

TABLE 3

|  | Precursor Web | Example 5 |
| --- | --- | --- |
| Hook Width 27 (μ) | 336 | 310 |
| Hook Height 30 (μ) | 404 | 375 |
| Hook Droop 24 (μ) | 82 | 69 |
| Hook Thickness 25 (μ) | None | 295 |
| Base Thickness 28 (μ) | 350 | 226 |
| Rail Width 26 (μ) | 323 | 267 |
| Rail Height 29 (μ) | 271 | 246 |
| Hook Spacing (CD, /cm) | 9 | 9 |
| Hook Spacing (MD, /cm) | none | 22 |

We claim:

1. A method for forming a flexible thermoplastic polymer netting comprising simultaneously extruding an inelastic polymer film having a base layer and at least on one face a plurality of integral strand structures, which strand structures extend in a first direction, cutting said formed film base layer in a second direction at an angle to said first direction at multiple coextensive cut lines substantially through the entire base layer without severing the strand structures so as to form a plurality of discrete cut portions, orienting said cut film at least in said first direction so as to separate said discrete cut portions forming a second set of parallel strands from the discrete cut portions and thereby orienting said integral inelastic strand structures.

2. The method for forming a thermoplastic polymer netting of claim 1 wherein said film has extruded structures on said second face.

3. The method for forming a thermoplastic polymer netting of claim 2 wherein said structures on said second film face form strands on said second set of strands.

4. The method for forming a thermoplastic polymer netting of claim 3 wherein said stems form hook elements.

5. The method for forming a thermoplastic polymer netting of claim 4 further comprising heat treating the hook elements following formation of the hook elements to alter the shape and or dimensions of the hook elements.

6. The method for forming a thermoplastic polymer netting of claim 1 further comprising stretching said second set of strands so that said second strands are oriented at an angle to said first direction.

7. A method for forming a thermoplastic polymer netting comprising simultaneously extruding a polymer film having a base layer and formed of a first thermoplastic resin layer and a second inelastic thermoplastic resin layer forming on one face of the film base layer forming a plurality of integral inelastic strand structures, which strand structures extend in a first direction, slitting said formed film base layer in a second direction at an angle to said first direction at multiple coextensive cut lines substantially through the entire film base layer without severing the strand structures so as to form a plurality of discrete seperable cut portions.

8. The method of claim 7 wherein the first thermoplastic resin layer is elastic and the method further includes the step of orienting said cut film in the first direction so as to separate said cut elastic portion forming an elastic netting.

9. The method of claim 7 wherein said strands formed from a substantially second inelastic second layer.

10. The method for forming a thermoplastic polymer netting of claim 7 wherein said cutting of said film is through the entire film so as to form separate discrete second strands from said second set of strands.

11. The method for forming a thermoplastic polymer netting of claim 7 wherein said film has extruded structures on said second face.

12. The method for forming a thermoplastic polymer netting of claim 11 wherein said structures on said second film face form stems on said second set of strands.

13. The method for forming a thermoplastic polymer netting of claim 12 wherein said stems form hook elements.

* * * * *

UNITED STATES PATENT AND TRADEMARK OFFICE
CERTIFICATE OF CORRECTION

PATENT NO. : 7,235,202 B2  Page 1 of 1
APPLICATION NO. : 10/706530
DATED : June 26, 2007
INVENTOR(S) : Jayshree Seth It is certified that error appears in the above-identified patent and that said Letters Patent is hereby corrected as shown below:

Column 4,
Line 46, After "invention" insert -- , --.

Column 6,
Line 4, Delete "Arlene," and insert -- arenes, --, therefor.

Column 10,
Line 11, Delete "3×in" and insert -- 3× in --, therefor.

Column 12,
Line 15, In Claim 3, delete "strands" and insert -- stems --, therefor.
Line 36, In Claim 3, delete "seperable" and insert -- separable --, therefor.

Signed and Sealed this

Fourteenth Day of August, 2007

JON W. DUDAS
*Director of the United States Patent and Trademark Office*